United States Patent
Ingman et al.

(10) Patent No.: US 7,397,423 B2
(45) Date of Patent: *Jul. 8, 2008

(54) GPS FOR COMMUNICATIONS FACILITY RECORDS

(75) Inventors: Robert M. Ingman, Peachtree City, GA (US); Charles E. Reddick, Palatka, FL (US); Steven G. Smith, Roswell, GA (US); Marvin R. Hamrick, Watkinsville, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/502,991

(22) Filed: Aug. 11, 2006

(65) Prior Publication Data

US 2006/0273957 A1     Dec. 7, 2006

Related U.S. Application Data

(63) Continuation of application No. 10/830,886, filed on Apr. 23, 2004, now Pat. No. 7,102,566, which is a continuation of application No. 10/174,856, filed on Jun. 19, 2002, now Pat. No. 6,753,809.

(51) Int. Cl.
*G01S 5/00* (2006.01)
(52) U.S. Cl. ............................ 342/357.13; 342/357.15
(58) Field of Classification Search ............ 342/357.06, 342/357.07, 357.15, 359, 357.13; 701/213, 701/215
See application file for complete search history.

(56) References Cited

U.S. PATENT DOCUMENTS

| | | | |
|---|---|---|---|
| 5,727,057 A | 3/1998 | Emery et al. | |
| 5,781,101 A | 7/1998 | Stephen et al. | |
| 6,753,809 B1 * | 6/2004 | Ingman et al. | 342/357.07 |
| 7,102,566 B2 * | 9/2006 | Ingman et al. | 342/357.13 |
| 7,130,399 B1 * | 10/2006 | Jean et al. | 379/126 |
| 2003/0216960 A1 | 11/2003 | Postel | |

* cited by examiner

*Primary Examiner*—Dao L Phan
(74) *Attorney, Agent, or Firm*—Scott P. Zimmerman, PLLC

(57) ABSTRACT

Methods and systems are disclosed for enhancing communications line records with Global Positioning System coordinates. One embodiment acquires Global Positioning System information and provides the Global Positioning System information to assemble a line record.

20 Claims, 4 Drawing Sheets

GPS FOR COMMUNICATIONS FACILITY RECORDS

CROSS-REFERENCE TO RELATED APPLICATIONS

This application is a continuation application of the commonly-assigned U.S. application Ser. No. 10/830,886, filed Apr. 23, 2004 and now issued as U.S. Pat. No. 7,102,566, which is itself a continuation of the commonly-assigned U.S. application Ser. No. 10/174,856, filed Jun. 19, 2002 and now issued as U.S. Pat. No. 6,753,809, with each incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to computers and to telecommunications and, more particularly, to methods and systems for creating a telephone line record including Global Positioning System (GPS) information.

2. Description of the Related Art

Most residential and business telephone customers are connected to a telecommunications network by cables and wires. The cables and wires include the familiar one or more telephone lines installed throughout nearly every home in the United States. Because cables and wires connect most homes and many businesses to the telecommunications network, the Public Switched Telephone Network includes billions of cables and wires. Each of these cables and wires must be maintained to provide superior communications service to the customer.

An accurate telephone line record is desirable when maintaining these cables and wires. A telephone "line record" describes a customer's telephone service, the condition of the telephone system physical facilities serving the customer, and the telephone equipment installed at the customer's residence or business. When a customer calls to report a problem, accurate telephone line records help identify the problem and help speed resolution.

A telephone line record, however, may have an incorrect, or an incomplete, address location. If the telephone line record is incorrect, then a technician struggles to locate the customer and the facilities serving that customer. When the address is incorrect, time and effort is wasted trying to find the correct service address and the facilities. If the technician had a precise address, the technician could respond quicker and resolve the customer's concern.

There is, accordingly, a need for accurate telephone line records, a need for methods and systems that provide a more precise location of a customer's service address, a need for methods and systems that provide a more precise location of the telephone plant facilities serving the customer, and a need for methods and systems that quickly and easily correct telephone line records.

BRIEF SUMMARY OF THE INVENTION

The aforementioned problems are reduced by a Line Record Assembler Module. The Line Record Assembler Module comprises computer programs and computer systems that utilize Global Positioning System information to improve telephone line records. When a customer reports a problem with their telecommunications service, this invention uses Global Positioning System information to accurately locate the customer's service address. This invention also uses the Global Positioning System information to accurately locate the telecommunications facilities serving that customer. Because the service address and the facilities are located using Global Positioning System coordinates, a technician quickly and precisely locates the customer and the facilities without using ancillary systems that require line record inputs to derive the waypoint. When the technician quickly locates the customer and the facilities, this invention allows for faster repairs of the telecommunications network. A fast repair also improves the customer's satisfaction with their telecommunications service provider.

One embodiment of this invention describes a method for enhancing telephone line records with Global Positioning System information. A Line Record Assembler module communicates with a network, gathers various types of information, and assembles this information into a line record. A "line record" describes a customer's telephone service(s), the physical facilities serving the customer, and the service address of the customer. The line record, for example, may include at least one of the following types of information: a listed name for the customer, a service address, a location for the customer, working conditions at the service address, a class of service, listing information, port status information, and location route number. The line record could also include a cable and a line pair serving the customer, F1 and F2 lines serving the customer, a cross-connect box serving the customer, a terminal serving the customer, and even one or more utility poles serving the customer. The line record could also include a universal service order code, a terminal address, and a remote terminal serving the customer. The Line Record Assembler module communicates with a network and acquires at least one of the following: customer service information associated with a telephone number, facility information associated with the telephone number, telephone equipment information associated with the telephone number, and Global Positioning System information associated with the telephone number. The Line Record Assembler module combines the customer service information, the facility information, the telephone equipment information, and the Global Positioning System information into a line record for the telephone number. The Global Positioning System information may include a latitude, a longitude, and/or an elevation that helps locate the customer and the telecommunications facilities serving the customer.

Another embodiment describes an alternative method for enhancing telephone line records with Global Positioning System information. A work order is dispatched, with the work order describing a reported problem with a telecommunications network. The work order is associated with a telephone number and comprises Global Positioning System information retrieved from a database. The Global Positioning System information is used for locating at least one of i) a service address associated with the telephone number and ii) a telephone plant facility associated with the telephone number. Updated Global Positioning System information is received, with the updated Global Positioning System information describing the actual location of the service address and/or the telephone plant facility associated with the telephone number. The updated Global Positioning System information is then stored in the database for future uses.

Still another embodiment describes a computer system for enhancing telephone line records. The system has a Line Record Assembler module stored in memory. The Line Record Assembler module acquires Global Positioning System information associated with a telephone number. The Line Record Assembler module uses the Global Positioning System information to create a telephone line record for the telephone number. A processor communicates with the memory and executes executable instructions.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
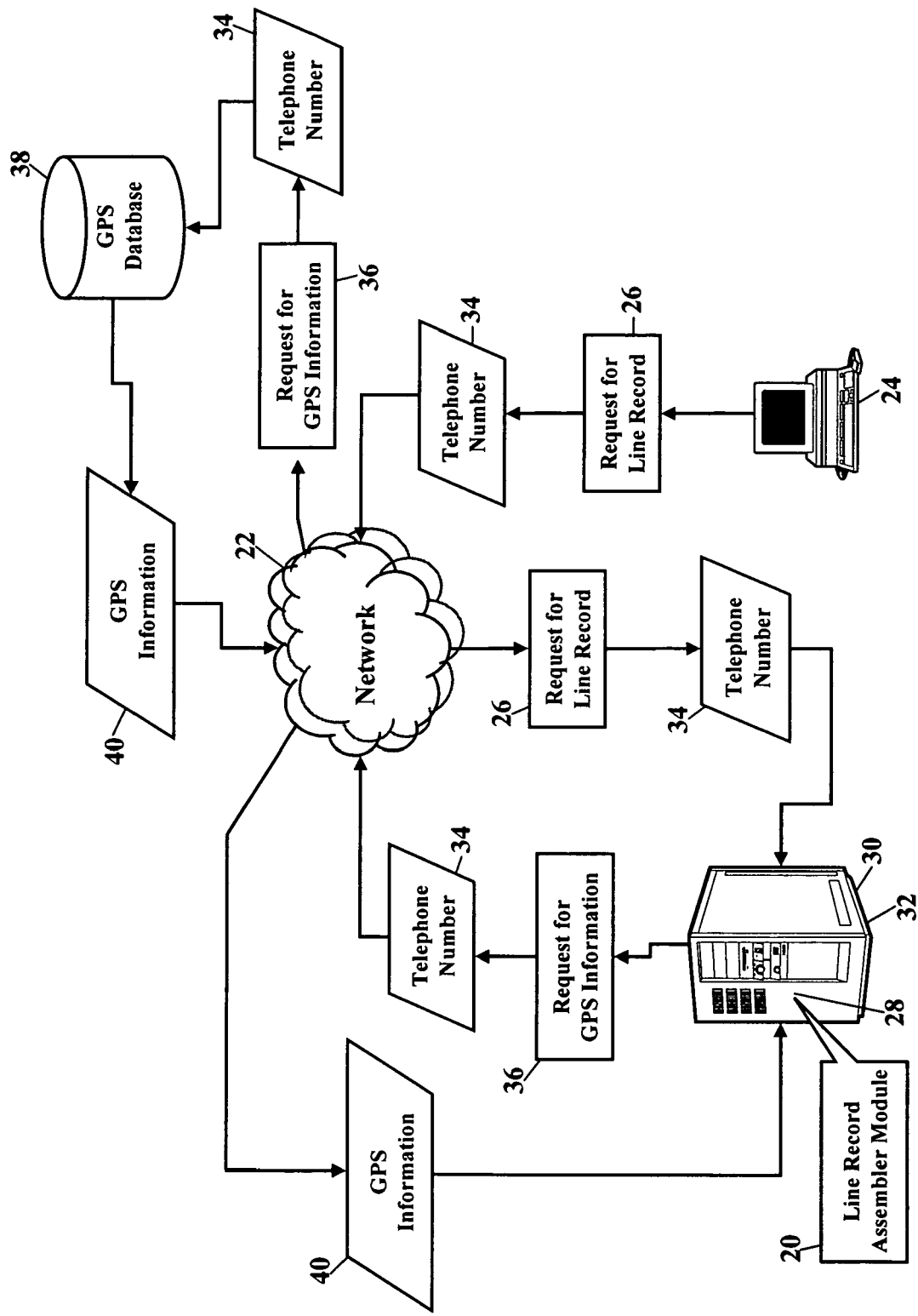
FIGS. 1 and 2 are block diagrams illustrating one embodiment of a Line Record Assembler Module according to this invention.
Figure 2:
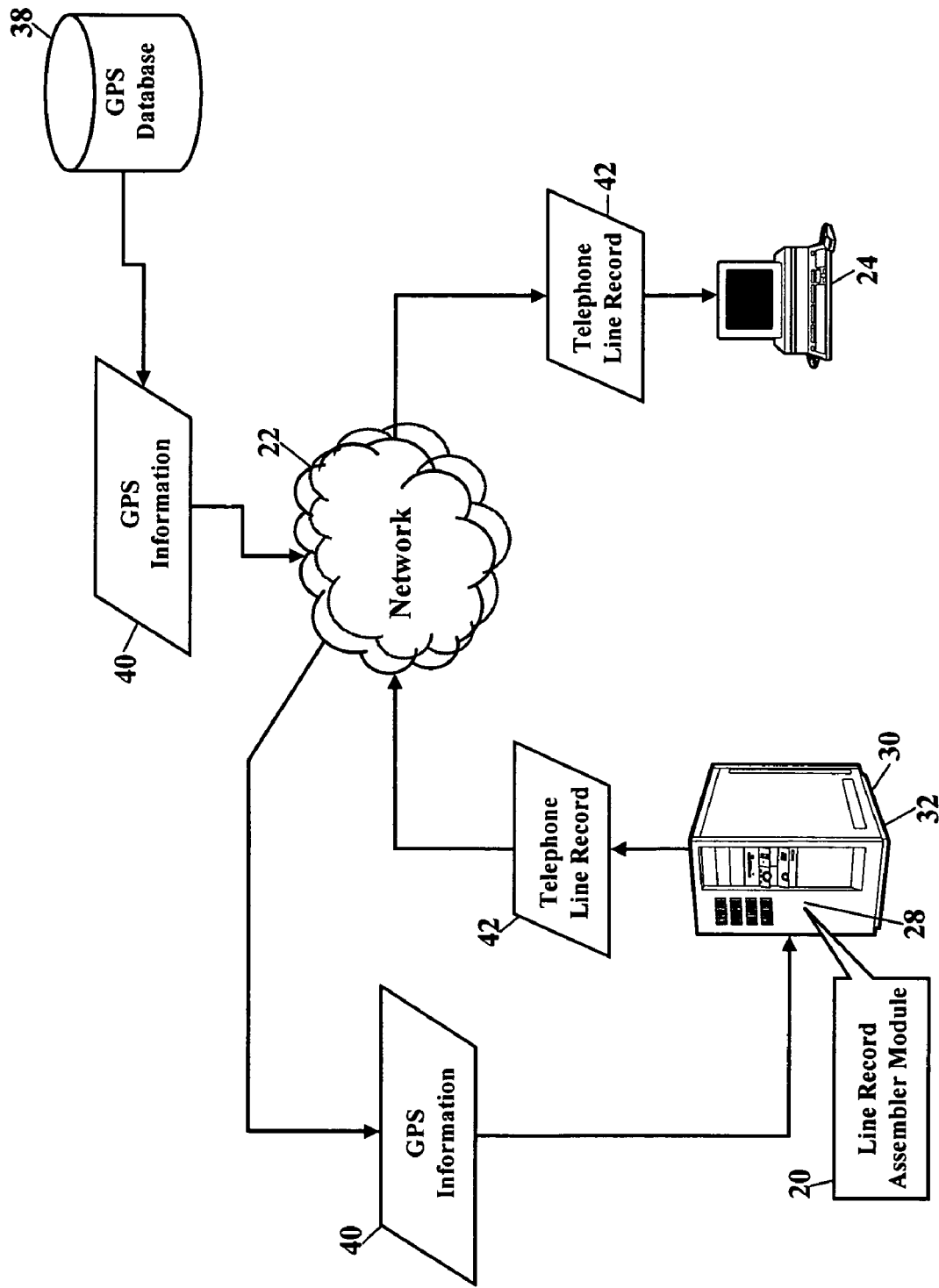

FIGS. 1 and 2 are block diagrams illustrating one embodiment of a Line Record Assembler Module 20. The Line Record Assembler module 20 is a computer program that acquires information from a network 22 and uses this information to construct a line record. A user at a user computer 24 issues a request 26 for a line record. The request 26 for the line record is communicated over the network 22 to the Line Record Assembler Module 20 using TCP/IP protocol or any other computer communications protocol. The Line Record Assembler Module 20 operates within memory 28 of a computer system 30. The computer system 30 is shown as a server 32. The request 26 for the line record also contains information representing a telephone number 34 for which the line record is sought. The Line Record Assembler Module 20 receives the request 26 for the line record and then requests information to assemble the line record.

The Line Record Assembler Module 20 retrieves Global Positioning System information. The Line Record Assembler Module 20 issues a request 36 for the Global Positioning System (GPS) information. This request 36 for the Global Positioning System information includes the customer's telephone number 34 and is communicated over the network 22. The request 36 for the Global Positioning System information, the service address, and the telephone number 34, is received by a Global Positioning System (GPS) database 38. The Global Positioning System database 38 stores Global Positioning System information associated with the telephone number 34. The Global Positioning System database 38 retrieves Global Positioning System (GPS) information 40 associated with the telephone number 34. The Global Positioning System information 40 is then communicated over the network 22 to the Line Record Assembler Module 20. The Line Record Assembler Module 20 acquires the Global Positioning System information 40 and then uses the Global Positioning System information 40 to construct a telephone line record.

FIG. 2 shows a telephone line record 42. After the Line Record Assembler Module 20 acquires the Global Positioning System information 40, the telephone line record 42 is assembled. The Line Record Assembler Module 20 uses the Global Positioning System information 40, and other acquired information, to construct the telephone line record 42. The telephone line record 42 is then communicated over the network 22 to the user at the user computer 24. Because the telephone line record 42 contains the Global Positioning System information 40, the user, whether a technician, customer representative, or other person, may quickly and precisely locate the customer's address and associated facilities.

The Global Positioning System information 40 is preferably latitude, longitude, and elevation. The latitude, the longitude, and the elevation (or height) would help technicians precisely locate the service address and the facilities associated with the telephone number. If, for example, the customer's service address is on the twentieth ($20^{th}$) floor of a high-rise apartment building, the latitude, the longitude, and the elevation allows the technician to quickly and precisely locate the customer and the facilities serving that customer. The Global Positioning System information 40, therefore, could describe the location of the customer's service address, a terminal serving the customer, a cross-connect box serving the customer, and/or a central office serving the customer. The Global Positioning System information 40 could also describe a wire center and a turf associated with the telephone number 34. The Global Positioning System information 40 could also describe one or more allocation areas within the turf, and the one or more allocation areas would also be associated with the telephone number 34. The Global Positioning System information 40 could alternatively be expressed in any x, y, and z coordinate value (such as feet, meters, miles, or kilometers). The Global Positioning System information 40 could also be expressed as position, velocity, and time coordinates, however, latitude, longitude, and elevation are more readily understood. Because the principals of satellite-based navigation are well understood, the Global Positioning System will not be further discussed. If the reader desires a more detailed explanation of the Global Positioning System, the National Aeronautical and Space Administration offers several tutorials and background papers. See http://leonardo.jpl.nasa.gov/msl/Programs/gps.html.

Figure 3:
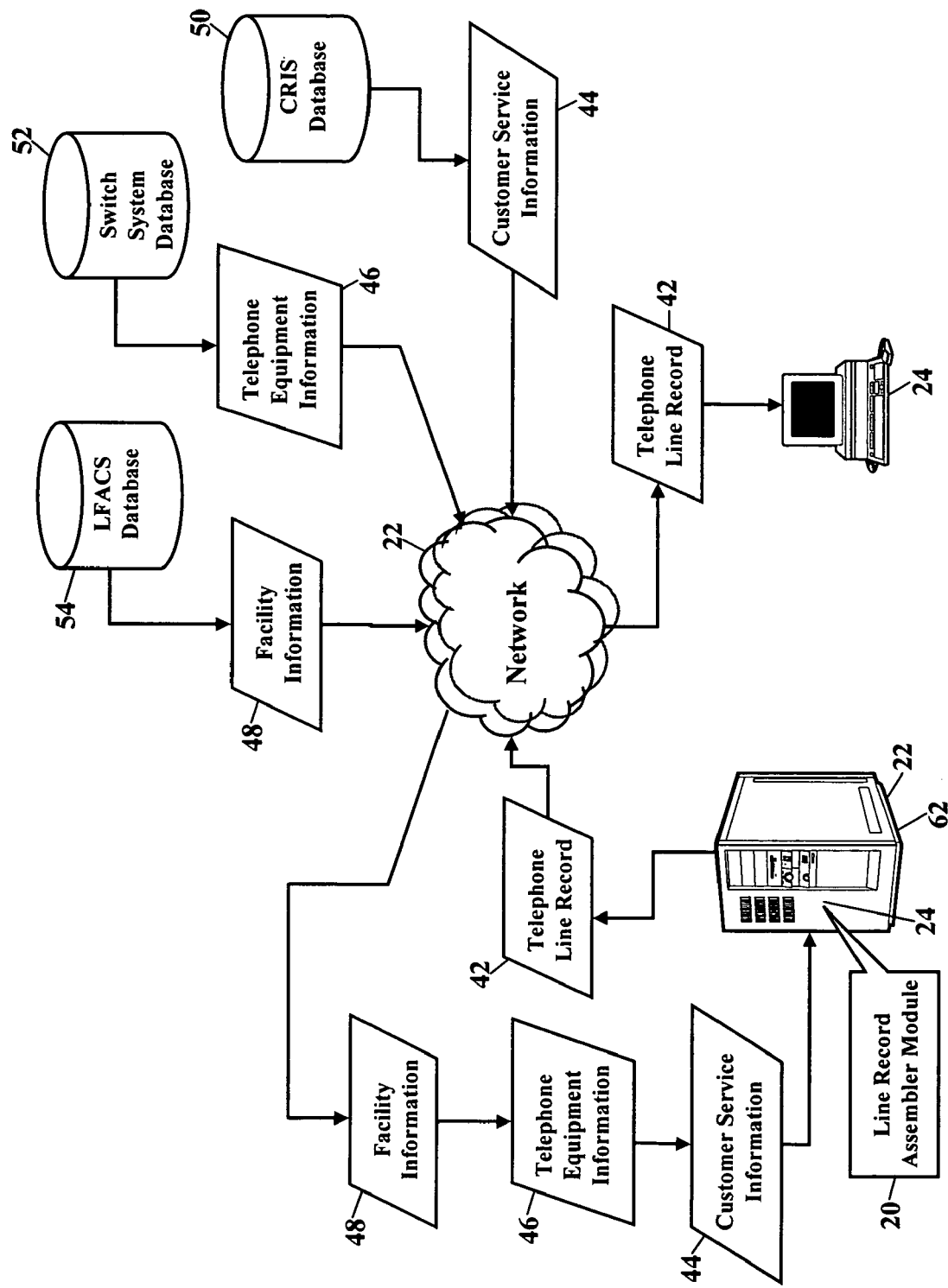
FIG. 3 is a block diagram illustrating another embodiment of the Line Record Assembler Module according to this invention.

FIG. 3 is a block diagram illustrating another embodiment of the Line Record Assembler Module 20. FIG. 3 shows the Line Record Assembler module 20 acquiring additional information when assembling the telephone line record 42. The Line Record Assembler module 20, for example, may acquire, via the network 22, customer service information 44, telephone equipment information 46, and facility information 48. The customer service information 44 is stored in a Customer Records Information System (CRIS) database 50, and the customer service information 44 describes many aspects of the customer and the customer's telephone service. The telephone equipment information 46 is stored in a switch system database 52, and the switch system database 52 inventories telephone equipment and telephone numbers. One such switch system database 52 is the TELCORDIA™ SWITCH™ system (TELCORDIA™ and SWITCH™ are trademarks of Telcordia Technologies, Inc., 445 South St., Morristown N.J. 07960, www.telcordia.com). The facility information 48 is stored in a Loop Facility Assignment Control System (LFACS) database 54, and the facility information 48 describes many aspects of the telephone system physical plant associated with the customer's telephone number. The customer service information 44, the telephone equipment information 46, and the facility information 48, however, are more fully described in the related and commonly-assigned U.S. application Ser. No. 09/946,405, entitled "METHODS AND SYSTEMS FOR ASSEMBLING TELEPHONE LINE RECORDS," filed Sep. 4, 2001, and of which the "Brief Summary of the Invention" and the "Detailed Description of the Invention" sections are incorporated herein by reference.

Figure 4:
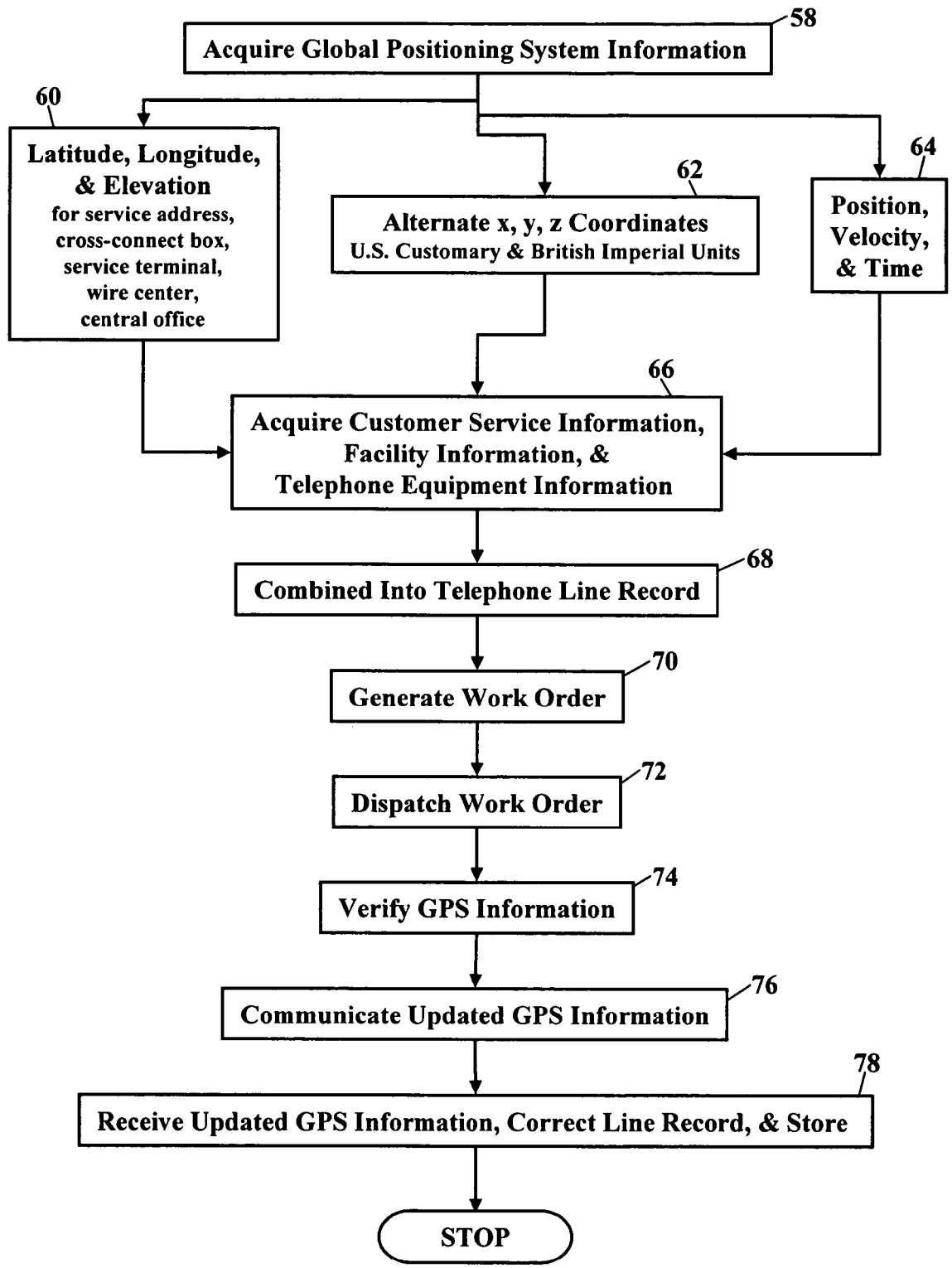
FIG. 4 is a flowchart showing one method of assembling a telephone line record according to this invention.

FIG. 4 is a flowchart showing one method of assembling a telephone line record. This method acquires Global Positioning System information associated with a telephone number (Block 58). The Global Positioning System information could include latitude, longitude, and elevation (Block 60) for a service address, for a cross-connect box, for a service terminal, for a remote terminal, for a hand hole, for a wire center, and for a central office associated with the telephone number. The Global Positioning System information could also include alternative x, y, and z coordinates (Block 62) for the service address, for the cross-connect box, for the service terminal, for the wire center, and/or for the central office associated with the telephone number. These alternative x, y, and z coordinates could be expressed in U.S. Customary and British Imperial units, such as feet and miles, or in metric units, such as meters and kilometers. The Global Positioning System information could also be expressed as position, velocity, and time measurements (Block 64) for the service address, for the cross-connect box, for the service terminal, for the wire center, and/or for the central office associated with the telephone number. This method could also acquire customer service information, the facility information, and the telephone equipment information (Block 66). The Global Positioning System information, the customer service information, the facility information, and the telephone equipment information are assembled into the telephone line record (Block 68) for the telephone number.

If the telecommunications network requires repair, a work order is generated (Block 70). The work order includes the Global Positioning System information from the telephone line record. The work order is dispatched (Block 72) to technician for the repair. When the technician arrives at the location specified by the Global Positioning System information, the technician may then verify (Block 74) the accuracy of the Global Positioning System information. The technician uses a Global Positioning System unit to determine the actual location of the customer's service address, the cross-connect box, or any other telephone plant facility. The Global Positioning System unit could be a handheld unit, a mobile unit installed within the technician's repair vehicle, or any other apparatus capable of determining Global Positioning System information. Once the actual location of the customer's service address, or of the telephone plant facility, is determined, that actual location is termed updated Global Positioning System information. This updated Global Positioning System information is then communicated back to the telecommunications service provider (Block 76). The telecommunications service provider receives the updated Global Positioning System information and, if necessary, corrects the telephone line record and stores the updated Global Positioning System information (Block 78).

The actual, updated Global Positioning System information is preferably wirelessly communicated to the telecommunications service provider. After the technician uses the Global Positioning System unit to determine the actual location of the customer's service address, or the actual location of the telephone plant facility, the technician communicates the actual location to the telecommunications service provider. The technician, for example, could strike a "hot" key on the Global Positioning System unit and cause the updated Global Positioning System information to be wirelessly transmitted. The technician, alternatively, could use a computing device to determine the difference between the Global Positioning System information from the telephone line record and the technician's actual, updated Global Positioning System information. The technician's computing device, for example, could be a calculator, a laptop computer, or a wireless communication device. If the difference exceeds some threshold value, then the actual, updated Global Positioning System information would be wirelessly communicated to the telecommunications service provider. When the actual, updated Global Positioning System information exceeds the threshold value, the technician's laptop computer, for example, would be programmed to automatically wirelessly transmit the actual, updated Global Positioning System information. The telecommunications service provider receives the updated Global Positioning System information and corrects the telephone line record (Block 78) to reflect the actual location. The technician, of course, could use a landline telephone or a wireless telephone to establish a call with the telecommunications service provider and to audibly provide the actual, updated Global Positioning System information. A phone call, however, would be slower and would introduce opportunities for operator error and for communication errors.

The Line Record Assembler Module (shown as reference numeral 20 in FIGS. 1-3), including the methods of the present invention, may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the this invention, allow the Line Record Assembler Module to be easily disseminated. A computer program product, for assembling a telephone line record including Global Positioning System information, comprises the computer-readable medium and the Line Record Assembler Module. The Line Record Assembler Module is stored on the computer-readable medium.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:
   acquiring Global Positioning System information associated with a telephone number;
   acquiring updated Global Positioning System information associated with the telephone number; and
   updating a line record associated with the telephone number using the updated Global Positioning System information.

2. A method according to claim 1, wherein acquiring the Global Positioning System information comprises acquiring a latitude and a longitude.

3. A method according to claim 1, wherein acquiring the Global Positioning System information comprises acquiring a latitude and a longitude associated with the telephone number.

4. A method according to claim 1, wherein acquiring the Global Positioning System information comprises acquiring a latitude and a longitude associated with a service address.

5. A method according to claim 1, wherein acquiring the Global Positioning System information comprises acquiring position, velocity, and time measurements.

6. A method according to claim 1, further comprising determining a difference between the Global Positioning System information and the updated Global Positioning System information.

7. A method according to claim 6, further comprising comparing the difference to a threshold value.

8. A method according to claim 7, wherein when the difference exceeds the threshold value, then communicating the updated Global Positioning System information.

9. A method according to claim 7, wherein when the difference exceeds the Threshold value, then wirelessly communicating the updated Global Positioning System information.

10. A method according to claim 7, wherein when the difference exceeds the threshold value, then automatically communicating the updated Global Positioning System information.

11. A method according to claim 1, further comprising receiving the updated Global Positioning System information.

12. A method according to claim 1, further comprising establishing a call to communicate the updated Global Positioning System information to correct the line record.

13. A method according to claim 1, further comprising receiving the updated Global Positioning System information from a Global Positioning System unit installed in a vehicle.

14. A method according to claim 1, wherein acquiring the Global Positioning System information comprises acquiring an elevation measurement.

15. A method according to claim 1, further comprising acquiring customer service information.

16. A method according to claim 1, further comprising acquiring facility information.

17. A method according to claim 1, further comprising acquiring equipment information.

18. A method, comprising:

dispatching a work order comprising Global Positioning System information associated with a line record for a telephone number; and receiving updated Global Positioning System information associated with the telephone number; and updating the line record using the updated Global Positioning System information.

19. A computer program product comprising processor executable instructions for performing a method, the method comprising:

acquiring Global Positioning System information associated with a telephone number;

acquiring updated Global Positioning System information associated with the telephone number; and updating a line record associated with the telephone number using the updated Global Positioning System information.

20. A system, comprising:

means for acquiring Global Positioning System information associated with a telephone number;

means for acquiring updated Global Positioning System information associated with the telephone number; and means for updating a line record associated with the telephone number using the updated Global Positioning System information.

* * * * *